United States Patent
Yang et al.

(10) Patent No.: US 10,810,372 B2
(45) Date of Patent: Oct. 20, 2020

(54) ANTECEDENT DETERMINING METHOD AND APPARATUS

(71) Applicant: TENCENT TECHNOLOGY (SHENZHEN) COMPANY LIMITED, Shenzhen, Guangdong (CN)

(72) Inventors: Yuekui Yang, Shenzhen (CN); Yujie Chen, Shenzhen (CN); Lin Zhao, Shenzhen (CN); Yulan Huang, Shenzhen (CN); Li Liu, Shenzhen (CN); Di Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 41 days.

(21) Appl. No.: 16/009,474

(22) Filed: Jun. 15, 2018

(65) Prior Publication Data
US 2018/0307671 A1  Oct. 25, 2018

Related U.S. Application Data

(63) Continuation of application No. PCT/CN2017/074800, filed on Feb. 24, 2017.

(30) Foreign Application Priority Data

May 20, 2016  (CN) .......................... 2016 1 0341637

(51) Int. Cl.
*G06F 40/284* (2020.01)
*G06F 40/30* (2020.01)

(52) U.S. Cl.
CPC ............ *G06F 40/284* (2020.01); *G06F 40/30* (2020.01)

(58) Field of Classification Search
USPC ....................................... 704/1–10
See application file for complete search history.

(56) References Cited

U.S. PATENT DOCUMENTS

| 5,799,268 A * | 8/1998 | Boguraev ........... G06F 17/2775 704/10 |
| 7,383,169 B1 * | 6/2008 | Vanderwende ..... G06F 17/2785 704/9 |

(Continued)

FOREIGN PATENT DOCUMENTS

| CN | 101446943 A | 6/2009 |
| CN | 102110087 A | 6/2011 |

(Continued)

OTHER PUBLICATIONS

Written Opinion of International Searching Authority dated May 24, 2017, in International Application PCT/CN2017/074800.

(Continued)

*Primary Examiner* — Abul K Azad
(74) *Attorney, Agent, or Firm* — Sughrue Mion, PLLC (57) ABSTRACT

An antecedent determining method is performed by at least one processor, and includes obtaining statement information, and determining whether a pronoun exists in the statement information. The method further includes extracting candidate antecedents and lexical features of the candidate antecedents, from the statement information, in response to the pronoun being found in the statement information, and determining, based on the lexical features of the candidate antecedents, a target antecedent that is referred to by the pronoun, among the candidate antecedents.

15 Claims, 6 Drawing Sheets

(56) References Cited

U.S. PATENT DOCUMENTS

| | | | | |
|---|---|---|---|---|
| 8,594,996 B2* | 11/2013 | Liang | ...................... | G06F 17/21 |
| | | | | 704/9 |
| 2009/0326919 A1 | 12/2009 | Bean | | |
| 2015/0215259 A1* | 7/2015 | Pellicer | ................ | H04L 51/063 |
| | | | | 709/206 |
| 2016/0253309 A1* | 9/2016 | Zhao | .................. | G06F 17/2863 |
| | | | | 704/9 |

FOREIGN PATENT DOCUMENTS

| | | |
|---|---|---|
| CN | 103150405 A | 6/2013 |
| CN | 104462053 A | 3/2015 |

OTHER PUBLICATIONS

Office Action dated May 13, 2019 in Chinese Application No. 201610341637.6.

Communication dated Jun. 20, 2019, issued by the Korean Intellectual Property Office in corresponding Korean Application No. 10-2018-7015847.

International Search Report of PCT/CN2017/074800 dated May 24, 2017.

Tetsuya Nasukawa, "Robust Method of Discourse Processing—New Approach to Use Discourse Information in Practical Natural Language Processing—", Journal of Japanese Society for Artificial Intelligence, Nov. 1996, vol. 11, No. 6, pp. 941-949 (Total 9 pages).

Communication dated Jul. 2, 2019 from Japanese Patent Office in counterpart JP Application No. 2018-529148.

Communication dated Mar. 2, 2020 from the Korean Intellectual Property Office in application No. 10-2018-7015847.

Communication dated Apr. 14, 2020, from The State Intellectual Property Office of the P.R. of China in Application No. 201610341637.6.

Communication dated Nov. 7, 2019 from the State Intellectual Property Office of the P.R.C in application No. 201610341637.6.

* cited by examiner

ANTECEDENT DETERMINING METHOD AND APPARATUS

CROSS REFERENCE TO RELATED APPLICATION

This application claims is a continuation of International Patent Application No. PCT/CN2017/074800, filed on Feb. 24, 2017, which claims priority from Chinese Patent Application No. 201610341637.6, filed in the Chinese Patent Office on May 20, 2016, and entitled "ANTECEDENT DETERMINING METHOD AND APPARATUS," which are incorporated herein by reference in their entireties.

BACKGROUND

1. Field

Methods and apparatuses consistent with example embodiments relate to the field of information processing, and specifically, to an antecedent determining method and apparatus.

2. Description of Related Art

In a human-machine dialog, a machine needs to accurately understand contextual information in a statement. If the machine cannot accurately understand the contextual information in the statement, fuzzy dialog information is caused. A coreference problem is a main problem leading to fuzzy information.

Broadly speaking, coreference resolution is a task that determines a noun phrase to which a pronoun refers in a chapter. In the existing technology, there are several coreference resolution algorithms as follows: (1) First, widely search from left to right to hierarchically traverse a syntactic tree to achieve resolution. In this algorithm, to-be-identified information needs to be traversed. Consequently, a traversal workload is heavy. (2) Add semantic constraint based on the syntactic knowledge. This manner has a not bad coreference resolution effect in English pronouns. However, it is difficult to process Chinese vocabularies and this method is inapplicable to coreference resolution of Chinese. (3) Add semantic information to a left-right centering (LRC) algorithm to implement filtering on candidate antecedents. However, the semantic information used by this algorithm needs to be manually defined in advance. A testing corpus also manually cleans disfluent components.

Because it is difficult to process Chinese shallow vocabularies, analyzing needs to be performed in resolution work. In addition, nouns have no clear singular-plural and gender features, and pronouns have no clear nominative and objective features. It is very common to omit words in spoken dialogs. These difficulties make the foregoing coreference resolution solution not applicable to coreference resolution of Chinese pronouns. At present, coreference resolution of pronouns mostly depends on corpus cleaning and tagging manually. There is no effective processing solution of coreference resolution.

SUMMARY

According to embodiments, there is provided an antecedent determining method being performed by at least one processor, the method including obtaining statement information, and determining whether a pronoun exists in the statement information. The method further includes extracting candidate antecedents and lexical features of the candidate antecedents, from the statement information, in response to the pronoun being found in the statement information, and determining, based on the lexical features of the candidate antecedents, a target antecedent that is referred to by the pronoun, among the candidate antecedents.

According to embodiments, there is provided an antecedent determining apparatus including at least one memory configured to store computer program code, and at least one processor configured to access the at least one memory and operate according to the computer program code. The computer program code includes first obtaining code configured to cause the at least one processor to obtain statement information, and first extraction code configured to cause the at least one processor to determine whether a pronoun exists in the statement information, and extract candidate antecedents and lexical features of the candidate antecedents, from the statement information, in response to the pronoun being found in the statement information. The computer program code further includes first determining code configured to cause the at least one processor to determine, based on the lexical features of the candidate antecedents, a target antecedent that is referred to by the pronoun, among the candidate antecedents.

According to embodiments, there is provided a non-transitory computer-readable storage medium storing instructions that cause at least one processor of an antecedent determining apparatus to obtain statement information, and determine whether a pronoun exists in the statement information. The instructions further cause the at least one processor to extract candidate antecedents and lexical features of the candidate antecedents, from the statement information, in response to the pronoun being found in the statement information, and determine, based on the lexical features of the candidate antecedents, a target antecedent that is referred to by the pronoun, among the candidate antecedents.

BRIEF DESCRIPTION OF THE DRAWINGS

The accompanying drawings described herein are intended to provide further understanding of the present disclosure and are composition part of this application. Embodiments and description thereof are intended to explain the present disclosure, and not to constitute an improper limitation to the present disclosure.

DETAILED DESCRIPTION OF EMBODIMENTS

To make a person skilled in the art understand solutions in the present disclosure better, the following clearly and completely describes the technical solutions in embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope of the present disclosure.

In the specification, claims, and accompanying drawings of the present disclosure, the terms "first," "second," and the like are intended to distinguish between similar objects rather than describe a specific order or sequence. Data used in this way is exchangeable in a proper case, so that the embodiments described herein can be implemented in another order except those shown or described herein. In addition, the terms "include," "have" and any other variants mean to cover the non-exclusive inclusion; for example, a process, method, system, product, or device that includes a series of steps or units is not necessarily limited to clearly listing those steps or units, but may include other steps or units not expressly listed or inherent to such a process, method, product, or device.

First, terms involved in the embodiments of this application are explained as follows:

Coreference: semantic relevance between a current pronoun and a word or a phrase occurring above.

Antecedent: a phrase having semantic relevance with a current pronoun, for example, a word or a phrase referred to by the pronoun.

Query: text information in a session.

Session: a session collection.

Predicate: a term used for describing or determining a property and feature of an object or a relationship between objects, and the predicate usually includes a verb and an adjective.

Adjacent word: a word at an adjacent position in statement information.

Dependent word: a semantic-dependent word.

According to an embodiment, an embodiment of an antecedent determining method is provided. A step shown in a flowchart of the accompanying drawings may be performed in a computer system such as a group of computer-executable instructions. In addition, although a logic order is shown in the flowchart, in some cases, the step shown or described may be performed in an order different from the order herein.

Figure 1:
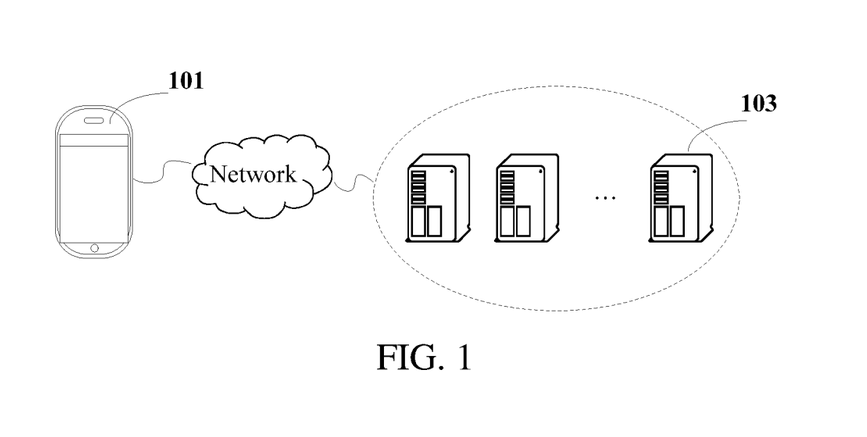
FIG. 1 is a schematic diagram of a network environment of an optional antecedent determining method according to an embodiment.

Optionally, in this embodiment, the foregoing information processing method may be applied to a network environment shown in FIG. 1.

FIG. 1 is a schematic diagram of a network environment of an optional antecedent determining method according to an embodiment. Referring to FIG. 1, the network environment includes a terminal 101 and a server 103 (the server may be a server for a network connection application or a cloud platform). The terminal may establish connection with the server through network, and a processor may be disposed on both of the terminal and the server.

The network includes, but is not limited to, a wide area network, a metropolitan area network, or a local area network. The terminal may be a terminal having an input device, for example, a mobile terminal (for example, a mobile phone or a tablet computer). The terminal may be provided with a smart dialog client. Optionally, the server corresponds to the smart conversion client, and the server may be configured to process information sent by the terminal by using the smart dialog client.

Figure 2:
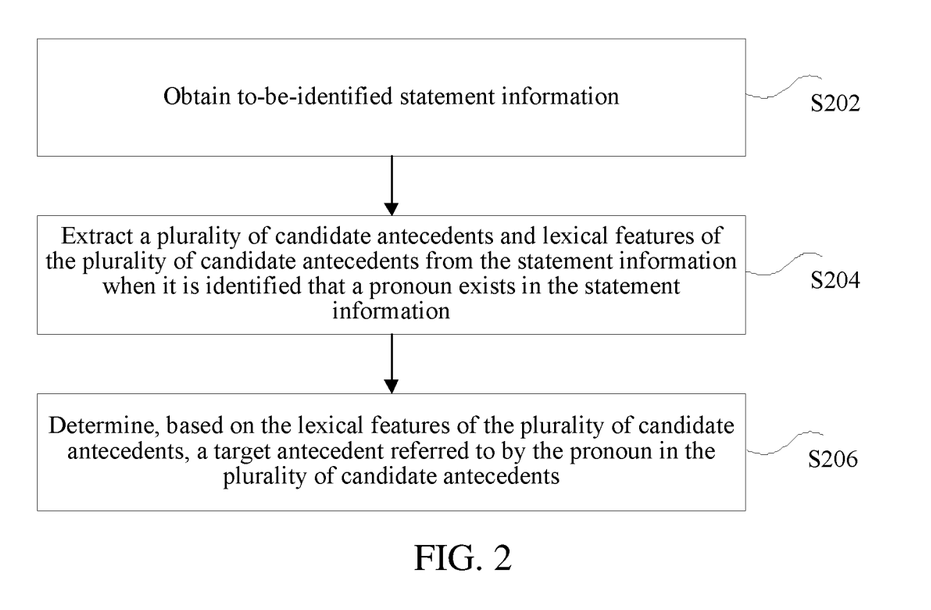
FIG. 2 is a flowchart of an antecedent determining method according to an embodiment.

FIG. 2 is a flowchart of an antecedent determining method according to an embodiment. As shown in FIG. 2, the method may include the following steps:

Step S202: Obtain to-be-identified statement information.

Step S204: Extract a plurality of candidate antecedents and lexical features of the plurality of candidate antecedents from the statement information when it is identified that a pronoun exists in the statement information.

Step S206: Determine, based on the lexical features of the plurality of candidate antecedents, a target antecedent referred to by the pronoun in the plurality of candidate antecedents.

In the foregoing embodiment, when the pronoun exists in the statement information, the candidate antecedents and the lexical features of the candidate antecedents are extracted from the statement information, and the target antecedent referred to by the pronoun is determined by using the lexical features of the candidate antecedents. In this solution, the target antecedent referred to by the pronoun can be automatically locked by using the lexical features of the candidate antecedents extracted from the statement information, to resolve a problem that coreference resolution has low processing efficiency in the existing technology, thereby accurately and high-efficiently determining an antecedent of a pronoun.

The pronoun, the candidate antecedent, and the lexical feature of the candidate antecedent in the foregoing embodiment are extracted from the statement information, and do not need to be pre-defined. Also, corpus cleaning and tagging do not need to be performed manually, thereby greatly improving a processing speed.

The to-be-identified statement information in the foregoing embodiment may be sent by a terminal to a server. The statement information may be text information. The text information may be obtained by converting voice information in session information, may be text information directly extracted from the statement information, or may be information extracted from a document. This application does not limit a source of the information.

The statement information is a session information collection generated in a process in which a client has a human-machine dialog with the server.

In the process of extracting the plurality of candidate antecedents and the lexical features of the plurality of candidate antecedents from the statement information, the candidate antecedents and statement features of the candidate antecedents may be sequentially extracted from the statement information, or the statement features of the candidate antecedents may be simultaneously extracted when the candidate antecedents are extracted from the statement information.

A word referred to by the pronoun may be a noun or a noun phrase, and the extracted candidate antecedents are nouns or noun phrases.

Further, in a process of extracting the pronoun and the plurality of candidate antecedents from the statement information, a preset analyzer may be used. Statement information in the statement information is analyzed by using the analyzer. A word whose part of speech is a pronoun (that is, a pronoun) and a noun/noun phrase (that is, the candidate antecedent) are extracted from a plurality of words obtained by analysis.

According to the foregoing embodiment, based on the lexical features of the plurality of candidate antecedents, the target antecedent referred to by the pronoun may be determined in the plurality of candidate antecedents. The lexical features may include a semantic feature and a syntactic feature.

The following describes this embodiment in detail:

After a terminal enables a smart dialog client (hereinafter referred to as a client), communication between the smart dialog client and a server is established. By means of the communication relationship, session information is sent to the server by using the smart dialog client. After the server receives the session information, if the session information is text information, the session information is used as statement information; and if the session information is voice information, the voice information is converted into text information and the converted text information is used as the statement information.

The server performs identification on the statement information. If it is identified that a pronoun exists in the statement information, a session collection (that is, the foregoing statement information) generated in the session process is obtained, and a plurality of candidate antecedents and lexical features of the candidate antecedents are extracted from the statement information. A target antecedent referred to by the pronoun is determined by using the lexical features.

After the target antecedent referred to by the pronoun is determined, the pronoun in the statement information may be replaced with the target antecedent, to complement the statement information.

According to the foregoing embodiment, the determining, based on the lexical features of the plurality of candidate antecedents, a target antecedent referred to by the pronoun in the plurality of candidate antecedents may include: determining a coreference weight value of each of the candidate antecedents based on the lexical feature of each of the candidate antecedents; and selecting a candidate antecedent with the largest coreference weight value as the target antecedent referred to by the pronoun.

The lexical feature in the foregoing embodiment may be a semantic feature or a syntactic feature. The coreference weight values that are corresponding to the pronoun and that are of the candidate antecedents are determined by using the semantic features and/or the syntactic features. The obtained coreference weight values are sorted to obtain a coreference weight value sequence. If the coreference weight value sequence is sorted in descending order according to the coreference weight values, a candidate antecedent corresponding to the first coreference weight value in the coreference weight value sequence is used as the target antecedent referred to by the pronoun; and if the coreference weight value sequence is sorted in ascending order according to the coreference weight values, a candidate antecedent corresponding to the last coreference weight value in the coreference weight value sequence is used as the target antecedent referred to by the pronoun.

In an optional implementation, after the coreference weight values that are corresponding to the pronoun and that are of the candidate antecedents are determined, the largest coreference weight value is obtained in a plurality of candidate antecedents in a pairwise comparison manner. A candidate antecedent corresponding to the largest coreference weight value is selected as the target antecedent referred to by the pronoun.

In an optional embodiment, each candidate antecedent in the plurality of candidate antecedents includes one or more lexical features. When each candidate antecedent in the plurality of candidate antecedents includes one lexical feature, the lexical feature of each of the candidate antecedent is converted into a feature value, and the feature value is used as a coreference weight value of the candidate antecedent.

In an optional embodiment, each candidate antecedent in the plurality of candidate antecedents includes one or more lexical features. The determining a coreference weight value of each of the candidate antecedents based on the lexical feature of each of the candidate antecedents includes performing linear weighted calculation on the feature value of each of the candidate antecedents by using preset feature coefficients of the one or more lexical features, to obtain the coreference weight value of each of the candidate antecedents.

When each candidate antecedent in the plurality of candidate antecedents includes a plurality of lexical features, lexical features of the candidate antecedents are respectively converted into feature values. Linear weighted calculation is performed on the plurality of feature values by using the preset feature coefficients of the one or more lexical features, to obtain the coreference weight value of each of the candidate antecedents.

For example, if there are two lexical features, the feature values of the two lexical features are $t_1$ and $t_2$ respectively. The preset feature coefficients of the two lexical features are obtained to be $\lambda_1$ and $\lambda_2$. Linear weighted calculation is performed on the two lexical features as follows:

$$\text{Weight} = \lambda_1 \cdot t_1 + \lambda_2 \cdot t_2.$$

Initial values may be granted to the feature coefficients of these features according to experience. Alternatively, a value of the feature coefficient may be adjusted by using a training corpus.

In an optional embodiment, each candidate antecedent in the plurality of candidate antecedents includes one or more lexical features. The lexical feature includes any one or any combination of the following: a singular-plural feature of the candidate antecedent, the distance between the candidate antecedent and the pronoun, whether the candidate antecedent occurs in a prepositional phrase, and semantic relevance between the pronoun and the candidate antecedent.

When the lexical feature includes the singular-plural feature of the candidate antecedent, because a singular pronoun cannot refer to a plural antecedent, singular-plural agreement is a feature to determine whether a coreferential relationship exists between two words. For example, "it is a nice day today, and classmates and I intend to hang out." The pronoun "I" herein is a singular and "classmates" is a plural, and the singular cannot refer to the plural. After the singular-plural feature is extracted, the singular-plural feature of the candidate antecedent may be converted into a feature value by using a feature whether the candidate antecedent and the pronoun meet singular-plural agreement. For example, if the candidate antecedent and the pronoun meet the singular-plural agreement, the feature value of the candidate antecedent is set to a first constant; if the candidate antecedent and the pronoun do not meet the singular-plural agreement, the feature value of the candidate antecedent is set to a second constant. Optionally, the first constant may be 1, and the second constant may be 0.

In the foregoing embodiment, the distance between the candidate antecedent and the pronoun usually considers the distance between sentences in which the two words are located or the distance between paragraphs in which the two words are located, or may refer to a character number between the two words. In a multiple-turn session, complete statement information is fully expressed by using a plurality of sentences. A closer distance between the sentences in which the candidate antecedent and the pronoun are located means greater relevance. Herein, it is also very meaningful to consider the distance between the pronoun and the antecedent. When the lexical feature includes the distance between the candidate antecedent and the pronoun, in a process of converting the lexical feature into the feature value, the distance between the sentences in which the candidate antecedent and the pronoun are located, or the character number or a statement number between the two words, is used as the feature value of the candidate antecedent.

Based on a large number of multiple-turn dialog corpora, it is found through analysis that a syntactic structure substantially affects coreference resolution work. A probability that a noun located in a direct object is referred to has no obvious difference with a probability that a noun located in an indirect object is referred to, but a probability that a noun located in a prepositional phrase is referred to is low. Therefore, in this embodiment, whether the candidate antecedent occurs in a prepositional phrase may be used as a lexical feature. When the lexical feature is converted into the feature value and when the candidate antecedent occurs in the prepositional phrase, the feature value may be set to a constant, for example, 1. When the candidate antecedent does not occur in the prepositional phrase, the feature value is set to another constant, for example, 0.

Optionally, relevance between semantic-dependent words may also be used as a lexical feature (that is, semantic relevance between the pronoun and the candidate antecedent in the foregoing embodiment). For example, the statement information is "the police find that a thief escapes from prison, and penalty on him is heavier." The candidate antecedent "thief" and the pronoun "him" respectively depends on "escapes from prison" and "penalty." The two semantic-dependent words have great relevance. It can be learned that the relevance between the semantic-dependent words of the pronoun and the candidate antecedent may help determine a coreferential relationship.

The semantic relevance between the pronoun and the candidate antecedent may be determined based on the relevance between the semantic-dependent words of the two words.

In an optional embodiment, P is a to-be-resolved pronoun, A is the candidate antecedent, $(Px_1, Px_2 K Px_i)$ is a dependent word of the pronoun, $(Ax_1, Ax_2 K Ax_j)$ is a dependent word of the candidate antecedent, I and j are natural numbers, i represents the number of the dependent word of the pronoun, and j represents the number of the dependent word of the candidate antecedent. Semantic relevance WordSence(P,A) between the pronoun P and the candidate antecedent A is:

$$WordSence(P, A) = \frac{\sum_{i,j} word2vec(Px_i, Ax_j)}{i * j}.$$

When the lexical feature includes the semantic relevance between the pronoun and the candidate antecedent, the feature value may be a value obtained by using the foregoing formula.

To better complement integrity of the dialog information, first, for the to-be-resolved pronouns in a training corpus, a candidate antecedent collection is determined. Then it is determined whether the pronoun needs to be resolved according to an agreement constraint rule. Feature extraction is performed. A Chinese personal pronoun coreference resolution method for a human-machine dialog is provided based on the distance between the pronoun and the candidate antecedent, semantic information, syntactic information, and the like, to determine a final candidate antecedent.

Optionally, before the plurality of candidate antecedents and the lexical features of the plurality of candidate antecedents are extracted from the statement information, it is determined whether the pronoun needs to be resolved. When it is determined that the pronoun needs to be resolved, the plurality of candidate antecedents and the lexical features of the plurality of candidate antecedents are extracted from the statement information. When it is determined that the pronoun does not need to be resolved, the plurality of candidate antecedents and the lexical features of the plurality of candidate antecedents are not extracted from the statement information.

Determining whether the pronoun needs to be resolved may be implemented by determining whether an adjacent word of the pronoun is a noun. If the adjacent word of the pronoun is a noun, it is determined that the pronoun does not need to be resolved. If the adjacent word of the pronoun is not a noun, it is determined that the pronoun needs to be resolved, so that the plurality of candidate antecedents and the lexical features of the plurality of candidate antecedents may be extracted from the statement information.

For example, "it is a nice day today and Xiao Ming he intends to hang out." Such a dialog often occurs in a daily dialog, and the pronoun "he" herein does not need to be resolved. From a syntactic aspect, an adjacent word of the pronoun "he" is "Xiao Ming." Xiao Ming is a noun. When two nouns are adjacent to each other, if one of the words is a noun, meaning of the pronoun can be understood without resolving the two words.

The extracting a plurality of candidate antecedents and lexical features of the plurality of candidate antecedents from the statement information includes: searching a pronoun in the statement information and obtaining an adjacent word of the found pronoun; and extracting the plurality of candidate antecedents and the lexical features of the plurality of candidate antecedents from the statement information when a part of speech of the adjacent word is not a noun.

In an optional embodiment, the extracting a plurality of candidate antecedents from the statement information includes: obtaining, in the statement information, a noun phrase whose distance from the pronoun is in a preset distance; determining whether the noun phrase and the pronoun are coreferential; and using the noun phrase as the candidate antecedent if the noun phrase and the pronoun are coreferential.

Figure 3:
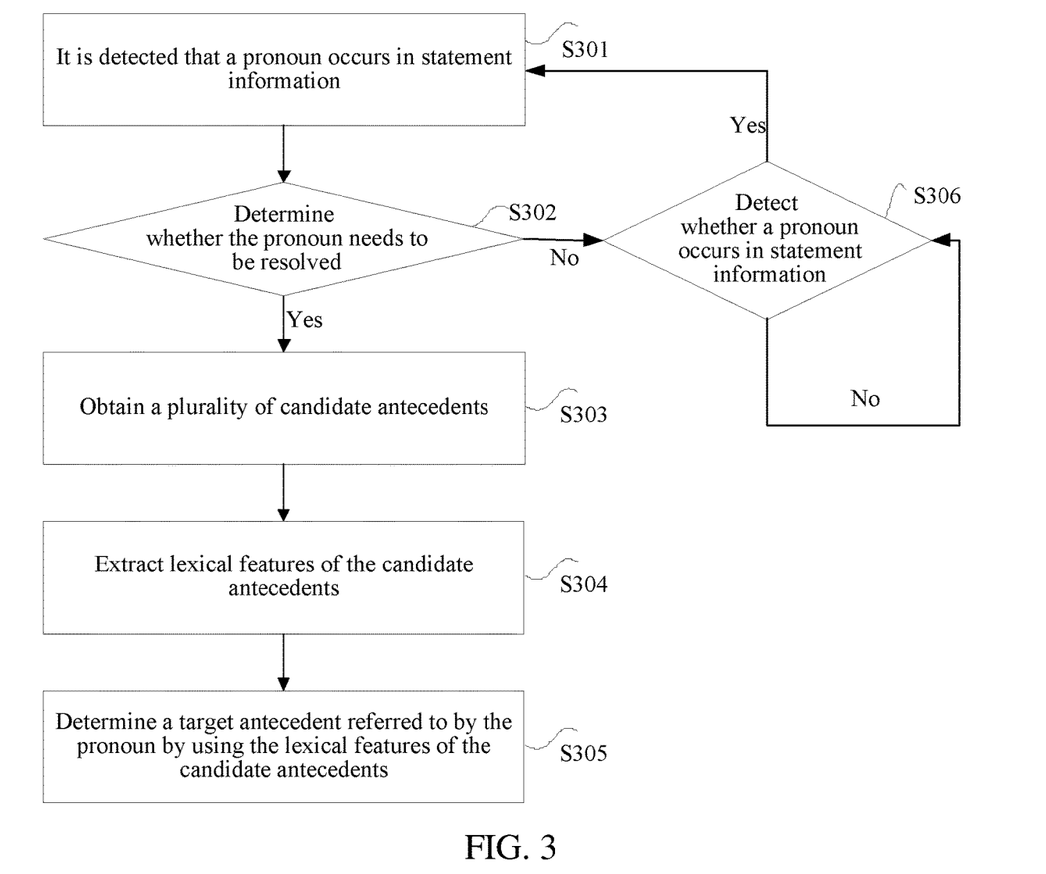
FIG. 3 is a flowchart of an antecedent determining method according to an embodiment.

FIG. 3 is a flowchart of an antecedent determining method according to an embodiment. As shown in FIG. 3, this embodiment may include the following steps:

Step S301: It is detected that a pronoun occurs in the statement information.

Optionally, a step of detecting whether a pronoun occurs in the statement information may be performed (that is, the following step S306). When the pronoun is detected, step S301 is performed.

Step S302: Determine whether the pronoun needs to be resolved.

If it is determined that the pronoun needs to be resolved, step S303 is performed; or if it is determined that the pronoun does not need to be resolved, continue to perform step S306: Detect whether a pronoun occurs in the statement information.

Step S302 may be performed by determining whether an adjacent word of the pronoun is a noun. If the adjacent word of the pronoun is a noun, it is determined that the pronoun does not need to be resolved; or if the adjacent word of the pronoun is not a noun, it is determined that the pronoun needs to be resolved.

Step S303: Obtain a plurality of candidate antecedents.

In this step, when the candidate antecedent is extracted from the statement information, whether to extract the word may be determined based on whether a coreferential relationship can exist between the to-be-extracted word and the pronoun. If the coreferential relationship can exist between the to-be-extracted word and the pronoun, the word is extracted; or if the coreferential relationship cannot exist between the to-be-extracted word and the pronoun, the word is not extracted.

Optionally, in this embodiment, after all candidate antecedents (for example, nouns or noun phrases) are extracted, filtering may also be performed on the plurality of candidate antecedents based on whether the candidate antecedent and the pronoun can be coreferential, to obtain filtered candidate antecedents. Subsequently, lexical features of the filtered candidate antecedents are extracted from the statement information, and a target antecedent is selected from the filtered candidate antecedents based on the extracted lexical features.

Step S304: Extract lexical features of the candidate antecedents.

Step S305: Determine a target antecedent referred to by the pronoun by using the lexical features of the candidate antecedents.

According to the foregoing embodiment, a noun or a noun phrase has a close distance from the pronoun may be searched in the statement information. That is, a noun phrase whose distance from the pronoun is in a preset distance is obtained in the statement information. After the noun phrase is found, if a coreferential relationship cannot exist between the noun phrase and the pronoun, the noun or the noun phrase is not extracted. That is, the noun or the noun phrase is not used as the candidate antecedent of the pronoun. If the noun or the noun phrase can be coreferential, the noun or the noun phrase is extracted, and is used as the candidate antecedent.

The determining whether the noun phrase and the pronoun are coreferential includes: determining whether a part of speech of a conjunction between the noun phrase and the pronoun is a predicate; and determining that the noun phrase and the pronoun are capable of referring to each other if the conjunction between the noun phrase and the pronoun is not a predicate; or determining that the noun phrase and the pronoun are not capable of referring to each other if the conjunction between the noun phrase and the pronoun is a predicate.

The predicate may be a verb or an adjective. For example, for "it is healthy to juice fruit by using the juicer," both the candidate antecedent "juicer" and the pronoun "fruit" are bound by the predicate "juice," so that the two words are not coreferential. Optionally, whether the pronoun and the candidate antecedent can be coreferential may be determined by using an output result of a parser.

In this embodiment, filtering may be performed on the candidate antecedent by determining whether the noun phrase and the pronoun can be coreferential, to reduce a processing quantity of words and lexical features.

Further, in this embodiment, after all candidate antecedents (for example, nouns or noun phrases) are extracted, filtering may also be performed on the plurality of candidate antecedents based on whether the candidate antecedent and the pronoun can be coreferential, to obtain filtered candidate antecedents. Subsequently, lexical features of the filtered candidate antecedents are extracted from the statement information, and a target antecedent is selected from the filtered candidate antecedents based on the extracted lexical features.

According to the foregoing embodiment, during resolution, values of weight (that is, coreference weight values) of the candidate antecedents may be sorted based on different feature weight linear weighting manners. A candidate antecedent with the largest weight serves as a final selected coreference word.

Figure 4:
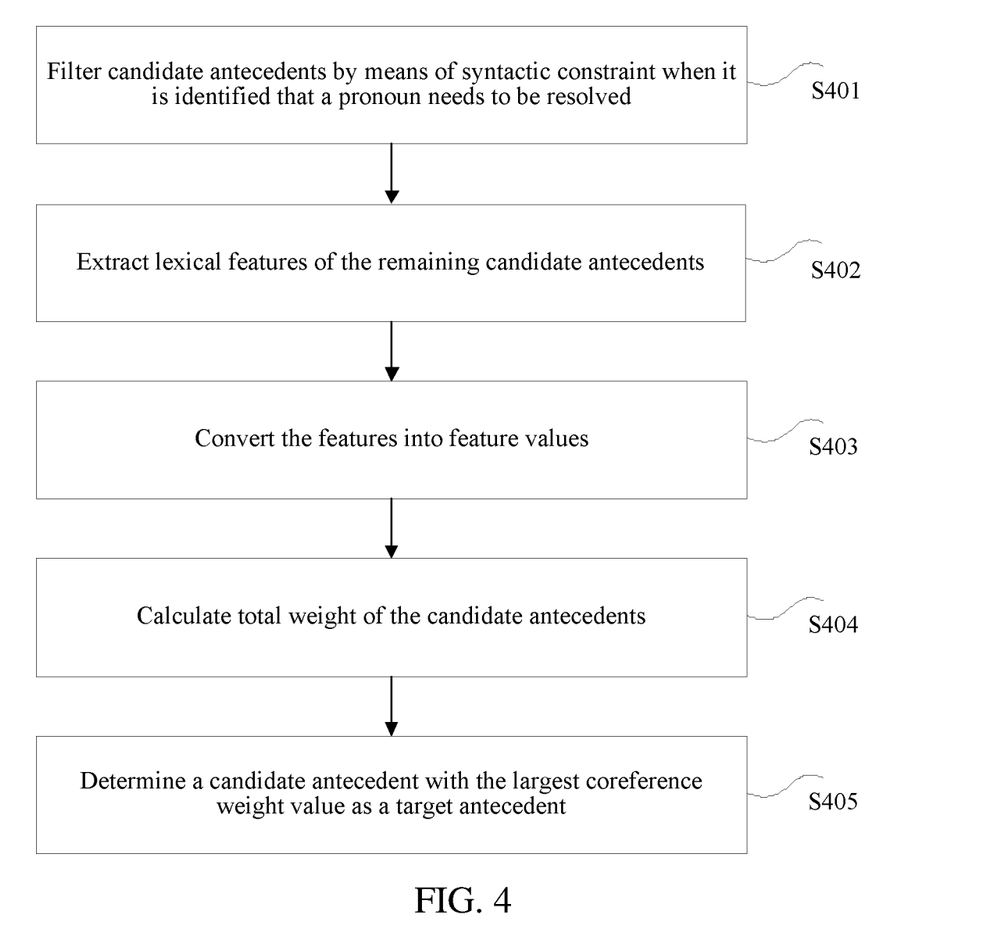
FIG. 4 is a flowchart of an antecedent determining method according to an embodiment.

FIG. 4 is a flowchart of an antecedent determining method according to an embodiment. As shown in FIG. 4, this embodiment may include the following steps:

Step S401: Filter candidate antecedents by means of syntactic constraint when it is identified that a pronoun needs to be resolved.

The syntactic constraint herein may refer to a rule meeting that a pronoun and a candidate antecedent cannot be coreferential. If the pronoun and the candidate antecedent cannot be coreferential, the candidate antecedent is directly filtered.

Step S402: Extract lexical features of the remaining candidate antecedents.

The lexical features may include a singular-plural feature, the distance between the candidate antecedent and the pronoun, semantic relevance between the candidate antecedent and the pronoun, whether the candidate antecedent is in a prepositional phrase, and the like.

Step S403: Convert the features into feature values.

Weight of singular-plural agreement is Sp. If the candidate antecedent and the pronoun meet singular-plural agreement, the weight is 1, or if the candidate antecedent and the pronoun do not meet singular-plural agreement, the weight is 0.

Distance feature weight is Dis. The number of the turn of a dialog between the candidate antecedent and the pronoun is a value of the feature value.

Syntactic constraint weight is Sc. If the candidate antecedent is in the prepositional phrase, the weight is 1, or if the candidate antecedent is not in the prepositional phrase, the weight is 0.

A semantic-dependent word relevance feature is Ws (that is, semantic relevance between the candidate antecedent and the pronoun). Optionally, the semantic-dependent word relevance feature may be implemented by using corresponding steps in the foregoing embodiment, and no more details are provided herein.

Step S404: Calculate total weight of the candidate antecedents (that is, the coreference weight value in the foregoing embodiment).

The total weight of the candidate antecedents is:

$$\text{Weight}=\lambda_1 \cdot \text{Sp}+\lambda_2 \cdot \text{Dis}+\lambda_3 \cdot \text{Sc}+\lambda_4 \cdot \text{Ws}$$

Initial values may be granted to coefficients (for example, $\lambda_1$) of the weight of these features according to experience, and then values of the coefficients of the weight are adjusted by using a training corpus.

Step S405: Determine a candidate antecedent with the largest coreference weight value as a target antecedent.

That is, the candidate antecedent with the largest weight is selected as a resolution result.

In the foregoing technical solution, features, for example, the distance between, and syntax and semantics of the pronoun and the candidate antecedent, are synthetically considered. In addition, this technology is finally applied to a real human-machine session scenario by analyzing a large quantity of real multiple-turn session corpora and adding a syntactic constraint rule, and a quite good effect is achieved.

The foregoing method embodiments are represented as a series of actions, but a person skilled in the art may appreciate that the present disclosure is not limited to the described order of the actions because some steps may be performed in another order or performed simultaneously according to the present disclosure. In addition, a person skilled in the art should also know that all the embodiments described in this specification are exemplary embodiments, and the related actions and modules are not necessarily required in the present disclosure.

Through the foregoing description of the implementations, it is clear to a person skilled in the art that the present disclosure may be implemented by software plus a universal hardware platform, and may also be implemented by hardware. Based on such an understanding, the technical solutions of the present disclosure or the part that makes contributions to the existing technology may be substantially embodied in the form of a software product. The computer software product is stored in a storage medium (for example, a ROM/RAM, a magnetic disk, or an optical disc), and includes several instructions for instructing a terminal device (which may be a mobile phone, a computer, a server, a network device, or the like) to perform the method according to the embodiments.

Figure 5:
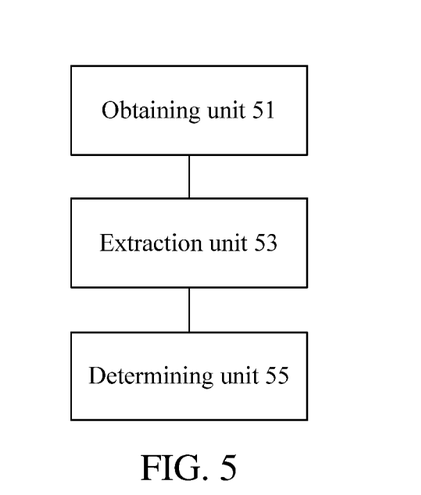
FIG. 5 is a schematic diagram of an antecedent determining apparatus according to an embodiment.

FIG. 5 is a schematic diagram of an antecedent determining apparatus according to an embodiment. As shown in FIG. 5, the apparatus includes:

an obtaining unit 51, configured to obtain to-be-identified statement information;

an extraction unit 53, configured to extract a plurality of candidate antecedents and lexical features of the plurality of candidate antecedents from the statement information when it is identified that a pronoun exists in the statement information; and a determining unit 55, configured to determine, based on the lexical features of the plurality of candidate antecedents, a target antecedent referred to by the pronoun in the plurality of candidate antecedents.

In the foregoing embodiment, when the pronoun exists in the statement information, the candidate antecedents and the lexical features of the candidate antecedents are extracted from the statement information, and the target antecedent referred to by the pronoun is determined by using the lexical features of the candidate antecedents. In this solution, the target antecedent referred to by the pronoun can be automatically locked by using the lexical features of the candidate antecedents extracted from the statement information, to resolve a problem that coreference resolution has low processing efficiency in the existing technology, thereby accurately and high-efficiently determining an antecedent of a pronoun.

The pronoun, the candidate antecedent, and the lexical feature of the candidate antecedent in the foregoing embodiment are extracted from the statement information, and do not need to be pre-defined, and corpus cleaning and tagging do not need to be performed manually, thereby greatly improving a processing speed.

The to-be-identified statement information in the foregoing embodiment may be sent by a terminal 101 to a server. The statement information may be text information. The text information may be obtained by converting voice information in session information, may be text information directly extracted from the statement information, or may be information extracted from a document. This application does not limit a source of the information.

The statement information is a session information collection generated in a process in which a client has a human-machine dialog with the server.

In the process of extracting the plurality of candidate antecedents and the lexical features of the plurality of candidate antecedents from the statement information, the candidate antecedents and statement features of the candidate antecedents may be sequentially extracted from the statement information, or the statement features of the candidate antecedents may be simultaneously extracted when the candidate antecedents are extracted from the statement information.

A word referred to by the pronoun may be a noun or a noun phrase, and the extracted candidate antecedents are nouns or noun phrases.

Further, in a process of extracting the pronoun and the plurality of candidate antecedents from the statement information, a preset analyzer may be used. Statement information in the statement information is analyzed by using the analyzer. A word whose part of speech is a pronoun (that is, a pronoun) and a noun/noun phrase (that is, the candidate antecedent) are extracted from a plurality of words obtained by analysis.

According to the foregoing embodiment, based on the lexical features of the plurality of candidate antecedents, the target antecedent referred to by the pronoun may be determined in the plurality of candidate antecedents. The lexical features may include a semantic feature and a syntactic feature.

After the target antecedent referred to by the pronoun is determined, the pronoun in the statement information may be replaced with the target antecedent, to complement the statement information.

Figure 6:
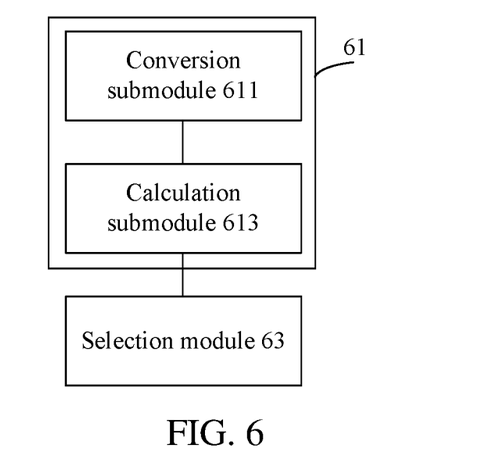
FIG. 6 is a schematic diagram of a determining unit of FIG. 5.

FIG. 6 is a schematic diagram of the determining unit 55 of FIG. 5. As shown in FIG. 6, the determining unit 55 includes a determining module 61, configured to determine a coreference weight value of each of the candidate antecedents based on the lexical feature of each of the candidate antecedents; and a selection module 63, configured to select a candidate antecedent with the largest coreference weight value as the target antecedent referred to by the pronoun.

The lexical feature in the foregoing embodiment may be a semantic feature or a syntactic feature. The coreference weight values that are corresponding to the pronoun and that are of the candidate antecedents are determined by using the semantic features and/or the syntactic features. The obtained coreference weight values are sorted to obtain a coreference weight value sequence. If the coreference weight value sequence is sorted in descending order according to the coreference weight values, a candidate antecedent corresponding to the first coreference weight value in the coreference weight value sequence is used as the target antecedent referred to by the pronoun; and if the coreference weight value sequence is sorted in ascending order according to the coreference weight values, a candidate antecedent corresponding to the last coreference weight value in the coreference weight value sequence is used as the target antecedent referred to by the pronoun.

In an optional implementation, after the coreference weight values that are corresponding to the pronoun and that are of the candidate antecedents are determined, the largest coreference weight value is obtained in a plurality of candidate antecedents in a pairwise comparison manner. A candidate antecedent corresponding to the largest coreference weight value is selected as the target antecedent referred to by the pronoun.

In an optional embodiment, each candidate antecedent in the plurality of candidate antecedents includes one or more lexical features. When each candidate antecedent in the plurality of candidate antecedents includes one lexical feature, the lexical feature of each of the candidate antecedent is converted into a feature value, and the feature value is used as a coreference weight value of the candidate antecedent.

Each candidate antecedent in the plurality of candidate antecedents includes one or more lexical features. The determining module 61 shown in FIG. 6 includes:

a conversion submodule 611, configured to convert the extracted lexical feature into a feature value; and a calculation submodule 613, configured to perform linear weighted calculation on the feature value of each of the candidate antecedents by using preset feature coefficients of the one or more lexical features, to obtain the coreference weight value of each of the candidate antecedents.

When each candidate antecedent in the plurality of candidate antecedents includes a plurality of lexical features, lexical features of the candidate antecedents are respectively converted into feature values. Linear weighted calculation is performed on the plurality of feature values by using the preset feature coefficients of the one or more lexical features, to obtain the coreference weight value of each of the candidate antecedents.

According to the foregoing embodiment, each candidate antecedent in the plurality of candidate antecedents includes one or more lexical features. The lexical feature includes any one or any combination of the following: a singular-plural feature of the candidate antecedent, the distance between the candidate antecedent and the pronoun, whether the candidate antecedent occurs in a prepositional phrase, and semantic relevance between the pronoun and the candidate antecedent.

The singular-plural feature of the candidate antecedent is converted into a feature value by using a feature whether the candidate antecedent and the pronoun meet singular-plural agreement. For example, if the candidate antecedent and the pronoun meet the singular-plural agreement, the feature value of the candidate antecedent is set to a first constant; if the candidate antecedent and the pronoun do not meet the singular-plural agreement, the feature value of the candidate antecedent is set to a second constant. Optionally, the first constant may be 1, and the second constant may be 0.

When the lexical feature includes the distance between the candidate antecedent and the pronoun, in a process of converting the lexical feature into the feature value, the distance between the sentences in which the candidate antecedent and the pronoun are located, or the character number or a statement number between the two words, is used as the feature value of the candidate antecedent.

When the lexical feature is converted into the feature value and when the candidate antecedent occurs in the prepositional phrase, the feature value may be set to a constant, for example, 1. When the candidate antecedent does not occur in the prepositional phrase, the feature value is set to another constant, for example, 0.

When the lexical feature includes the semantic relevance between the pronoun and the candidate antecedent, the feature value may be a value obtained by using the foregoing formula.

Figure 7:
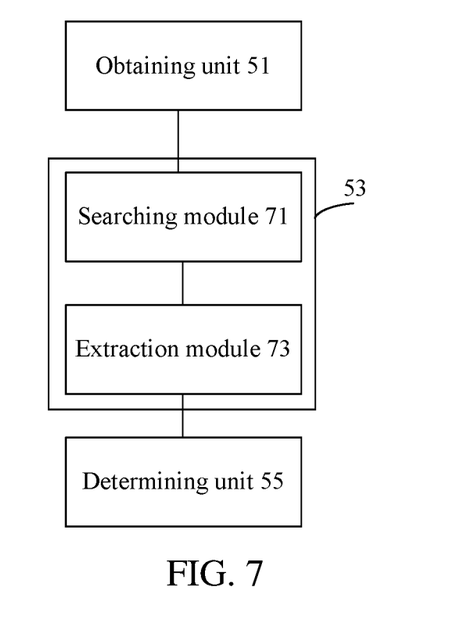
FIG. 7 is a schematic diagram of an antecedent determining apparatus according to an embodiment.

FIG. 7 is a schematic diagram of an antecedent determining apparatus according to an embodiment. As shown in FIG. 7, the antecedent determining apparatus may include the obtaining unit, the extraction unit 53 and the determining unit 55 of FIG. 5. The extraction unit 53 may include a searching module 71, configured to search an adjacent word of the pronoun in the statement information; and an extraction module 73, configured to extract the plurality of candidate antecedents and the lexical features of the plurality of candidate antecedents from the statement information when a part of speech of the adjacent word is not a noun.

Figure 8:
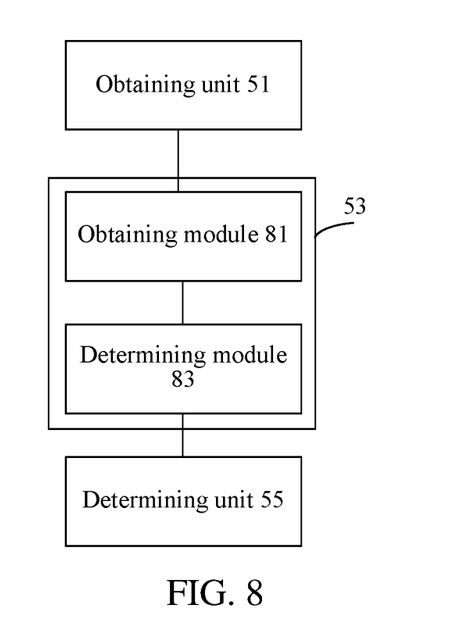
FIG. 8 is a schematic diagram of an antecedent determining apparatus according to an embodiment.

FIG. 8 is a schematic diagram of an antecedent determining apparatus according to an embodiment. As shown in FIG. 8, the antecedent determining apparatus may include the obtaining unit, the extraction unit 53 and the determining unit 55 of FIG. 5. The extraction unit may include an obtaining module 81, configured to obtain, in the statement information, a noun phrase whose distance from the pronoun is in a preset distance; and a determining module 83, configured to: determine whether the noun phrase and the pronoun are coreferential; and use the noun phrase as the candidate antecedent if the noun phrase and the pronoun are coreferential.

Further, the determining module includes a determining submodule, configured to determine whether a part of speech of a conjunction between the noun phrase and the pronoun is a predicate; and determine that the noun phrase and the pronoun are capable of referring to each other if the conjunction between the noun phrase and the pronoun is not a predicate, or determine that the noun phrase and the pronoun are not capable of referring to each other if the conjunction between the noun phrase and the pronoun is a predicate.

To better complement integrity of the dialog information, first, for the to-be-resolved pronouns in a training corpus, a candidate antecedent collection is determined. Then it is determined whether the pronoun needs to be resolved according to an agreement constraint rule. Feature extraction is performed. A Chinese personal pronoun coreference resolution method for a human-machine dialog is provided based on the distance between the pronoun and the candidate antecedent, semantic information, syntactic information, and the like, to determine a final candidate antecedent.

The modules provided in this embodiment are the same with the using method provided by corresponding steps of the method embodiment, and application scenarios may also be the same. The solution related to the foregoing modules may not be limited to content and scenarios in the foregoing embodiment, and the foregoing modules may run on a computer terminal or a mobile terminal and may be implemented by using software or hardware.

According to an embodiment, a server for implementing the foregoing antecedent determining method and apparatus is further provided.

Figure 9:
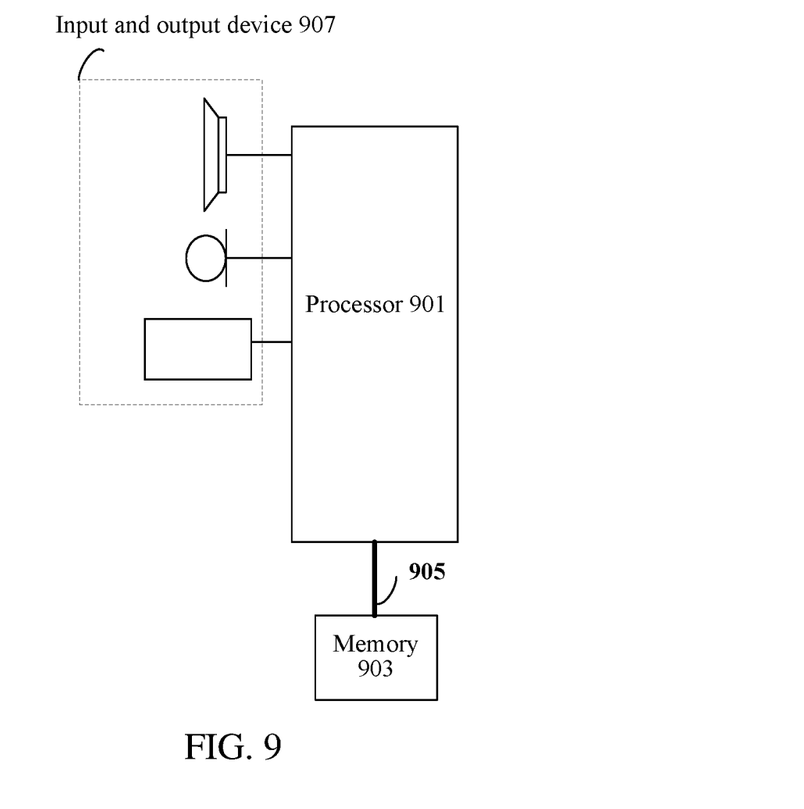
FIG. 9 is a block diagram of an internal structure of a server according to an embodiment.

FIG. 9 is a block diagram of an internal structure of a server according to an embodiment. As shown in FIG. 9, the server includes: one or more (one is shown in the figure) processors 901, a memory 903, and a transmission apparatus 905 (for example, a sending apparatus in the foregoing embodiment). As shown in FIG. 9, the terminal may further include an input and output device 907.

The memory 903 may be configured to store a software program and a module, for example, a program instruction/ module corresponding to the antecedent determining method and apparatus in the embodiments, and the processor 901 performs various functional applications and data processing by running a software program and a module stored in the memory 903, that is, implementing the foregoing antecedent determining method. The memory 903 may include a high-speed random memory, and may also include a nonvolatile memory such as one or more magnetic storage devices, a flash memory, or another nonvolatile solid-state memory. In some examples, the memory 903 may further include memories remotely disposed relative to the processor 901, and these remote memories may be connected to the terminal through a network. Examples of the network include, but are not limited to, the Internet, an intranet, a local area network, a mobile communications network, and a combination thereof.

The foregoing transmission apparatus 905 is configured to receive or send data through a network, and may further configured to transmit data between the processor and the memory. Examples of the foregoing network may include a wired network and a wireless network. In an example, the transmission apparatus 905 includes a network interface controller (NIC) that may be connected to another network device and a router by using a network cable, thereby communicating with the Internet or a local area network. In an example, the transmission apparatus 905 is a radio frequency (RF) module that is configured to communicate with the Internet in a wireless manner.

The memory 903 is configured to store an application program.

The processor is configured to perform the following steps: obtaining to-be-identified statement information; extracting a plurality of candidate antecedents and lexical features of the plurality of candidate antecedents from the statement information when it is identified that a pronoun exists in the statement information; and determining, based on the lexical features of the plurality of candidate antecedents, a target antecedent referred to by the pronoun in the plurality of candidate antecedents.

The processor is further configured to perform the following steps: determining a coreference weight value of each of the candidate antecedents based on the lexical feature of each of the candidate antecedents; and selecting a candidate antecedent with the largest coreference weight value as the target antecedent referred to by the pronoun.

Each candidate antecedent in the plurality of candidate antecedents includes one or more lexical features, and the determining a coreference weight value of each of the candidate antecedents based on the lexical feature of each of the candidate antecedents includes performing linear weighted calculation on the feature value of each of the candidate antecedents by using preset feature coefficients of the one or more lexical features, to obtain the coreference weight value of each of the candidate antecedents.

Each candidate antecedent in the plurality of candidate antecedents includes one or more lexical features, and the lexical feature includes any one or any combination of the following: a singular-plural feature of the candidate antecedent, the distance between the candidate antecedent and the pronoun, whether the candidate antecedent occurs in a prepositional phrase, and semantic relevance between the pronoun and the candidate antecedent.

The extracting a plurality of candidate antecedents and lexical features of the plurality of candidate antecedents from the statement information includes: searching an adjacent word of the pronoun in the statement information; and extracting the plurality of candidate antecedents and the lexical features of the plurality of candidate antecedents from the statement information when a part of speech of the adjacent word is not a noun.

The extracting a plurality of candidate antecedents from the statement information includes: obtaining, in the statement information, a noun phrase whose distance from the pronoun is in a preset distance; determining whether the noun phrase and the pronoun are coreferential; and using the noun phrase as the candidate antecedent if the noun phrase and the pronoun are coreferential.

The determining whether the noun phrase and the pronoun are coreferential includes: determining whether a part of speech of a conjunction between the noun phrase and the pronoun is a predicate; and determining that the noun phrase and the pronoun are capable of referring to each other if the conjunction between the noun phrase and the pronoun is not a predicate; or determining that the noun phrase and the pronoun are not capable of referring to each other if the conjunction between the noun phrase and the pronoun is a predicate.

Optionally, for an example in this embodiment, refer to the examples described in foregoing figures, and details are not described herein again in this embodiment.

A person of ordinary skill in the art may understand that, the structure shown in FIG. 9 is only schematic. Alternatively, the terminal may be a terminal device such as a smartphone (such as an Android mobile phone or an iOS mobile phone), a tablet computer, a palmtop computer, a mobile Internet device (MID), or a PAD. FIG. 9 does not limit the structure of the foregoing electronic apparatus. For example, the terminal may further include more or less components (such as a network interface and a processing apparatus) than those shown in FIG. 9, or has a configuration different from that shown in FIG. 9.

An embodiment further provides a storage medium. Optionally, in this embodiment, the storage medium may be configured to store program code used for performing the foregoing method.

Optionally, in this embodiment, the storage medium is configured to store program code used for performing the following steps: obtaining to-be-identified statement information; extracting a plurality of candidate antecedents and lexical features of the plurality of candidate antecedents from the statement information when it is identified that a pronoun exists in the statement information; and determining, based on the lexical features of the plurality of candidate antecedents, a target antecedent referred to by the pronoun in the plurality of candidate antecedents.

The storage medium is configured to store program code used for performing the following steps: determining a coreference weight value of each of the candidate antecedents based on the lexical feature of each of the candidate antecedents; and selecting a candidate antecedent with the largest coreference weight value as the target antecedent referred to by the pronoun.

Each candidate antecedent in the plurality of candidate antecedents includes one or more lexical features, and the determining a coreference weight value of each of the candidate antecedents based on the lexical feature of each of the candidate antecedents includes: performing linear weighted calculation on the feature value of each of the candidate antecedents by using preset feature coefficients of the one or more lexical features, to obtain the coreference weight value of each of the candidate antecedents.

Each candidate antecedent in the plurality of candidate antecedents includes one or more lexical features, and the lexical feature includes any one or any combination of the following: a singular-plural feature of the candidate antecedent, the distance between the candidate antecedent and the pronoun, whether the candidate antecedent occurs in a prepositional phrase, and semantic relevance between the pronoun and the candidate antecedent.

The extracting a plurality of candidate antecedents and lexical features of the plurality of candidate antecedents from the statement information includes: searching an adjacent word of the pronoun in the statement information; and extracting the plurality of candidate antecedents and the lexical features of the plurality of candidate antecedents from the statement information when a part of speech of the adjacent word is not a noun.

The extracting a plurality of candidate antecedents from the statement information includes: obtaining, in the statement information, a noun phrase whose distance from the pronoun is in a preset distance; determining whether the noun phrase and the pronoun are coreferential; and using the noun phrase as the candidate antecedent if the noun phrase and the pronoun are coreferential.

The determining whether the noun phrase and the pronoun are coreferential includes: determining whether a part of speech of a conjunction between the noun phrase and the pronoun is a predicate; and determining that the noun phrase and the pronoun are capable of referring to each other if the conjunction between the noun phrase and the pronoun is not a predicate; or determining that the noun phrase and the pronoun are not capable of referring to each other if the conjunction between the noun phrase and the pronoun is a predicate.

Optionally, in this embodiment, the foregoing storage medium may include, but is not limited to, any medium that can store program code, such as a USB flash drive, a read-only memory (ROM), a random access memory (RAM), a removable hard disk, a magnetic disk, or an optical disc.

Optionally, for an example in this embodiment, refer to the examples described in the foregoing embodiments, and details are not described herein again in this embodiment.

The sequence numbers of the preceding embodiments are for description purpose but do not indicate the preference of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the present disclosure may be contributing to the existing technology, or all or some of the technical solutions may be implemented in a form of a software product. The computer software product is stored in a storage medium and includes several instructions for instructing one or more computer devices (which may be a personal computer, a server, or a network device) to perform all or some of the steps of the methods in the embodiments.

In the foregoing embodiments, the description of each embodiment has respective focuses. For the part that is not detailed in an embodiment, refer to the relevant description of other embodiments.

In the several embodiments provided in this application, the disclosed client may be implemented in other manners. For example, the described apparatus embodiment is an example. For example, the unit division is logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

The foregoing descriptions are exemplary implementations of the present disclosure. A person of ordinary skill in the art may make several improvements or polishing without departing from the principle of the present disclosure and the improvements or polishing shall fall within the protection scope of the present disclosure.

What is claimed is:

1. An antecedent determining method being performed by at least one processor, the method comprising:
   obtaining statement information;
   determining whether a pronoun exists in the statement information;
   extracting candidate antecedents and lexical features of the candidate antecedents, from the statement information, in response to the pronoun being found in the statement information;
   determining a coreference weight value of each of the candidate antecedents, by:
      converting a respective one of the lexical features into a feature value; and
      performing linear weighted calculation on the feature value, based on preset feature coefficients of the respective one of the lexical features; and
   selecting a candidate antecedent with a largest coreference weight value that is determined, from the candidate antecedents, as a target antecedent referred to by the pronoun,
   wherein the lexical feature comprises a semantic-dependent relevance between a first dependent word that depends on the pronoun, and a second dependent word that depends on the candidate antecedent.

2. The method according to claim 1, wherein each of the lexical features comprises any one or any combination of a singular-plural feature of a respective one of the candidate antecedents, a distance between the respective one of the candidate antecedents and the pronoun, whether the respective one of the candidate antecedents occurs in a prepositional phrase, and semantic relevance between the pronoun and the respective one of the candidate antecedents.

3. The method according to claim 1, wherein the extracting the candidate antecedents and the lexical features comprises:
   searching an adjacent word of the pronoun, in the statement information; and
   extracting the candidate antecedents and the lexical features, from the statement information, when a part of speech of the adjacent word is not a noun.

4. The method according to claim 1, wherein the extracting the candidate antecedents and the lexical features comprises:
obtaining, in the statement information, a noun phrase within a preset distance from the pronoun;
determining whether the noun phrase and the pronoun are coreferential; and
using the noun phrase as one of the candidate antecedents, in response to the noun phrase and the pronoun being determined to be coreferential.

5. The method according to claim 4, wherein the determining whether the noun phrase and the pronoun are coreferential comprises:
determining whether a part of speech of a conjunction between the noun phrase and the pronoun is a predicate; and
determining that the noun phrase and the pronoun are capable of referring to each other, in response to the part of speech of the conjunction being determined to not be a predicate; and
determining that the noun phrase and the pronoun are not capable of referring to each other, in response to the part of speech of the conjunction being determined to be a predicate.

6. The method according to claim 1, further comprising determining the semantic-dependent relevance by:
identifying a word that is separate from the pronoun and depends on the pronoun as the first dependent word;
identifying a word that is separate from the candidate antecedent and depends on the candidate antecedent as the second dependent word;
determining an amount of relevance between the first dependent word and the second dependent word as the semantic-dependent relevance.

7. An antecedent determining apparatus comprising:
at least one memory configured to store computer program code; and
at least one processor configured to access the at least one memory and operate according to the computer program code, the computer program code comprising:
first obtaining code configured to cause the at least one processor to obtain statement information;
first extraction code configured to cause the at least one processor to:
determine whether a pronoun exists in the statement information; and
extract candidate antecedents and lexical features of the candidate antecedents, from the statement information, in response to the pronoun being found in the statement information; and
determining code configured to cause the at least one processor to determine a coreference weight value of each of the candidate antecedents, by:
converting a respective one of the lexical features into a feature value; and
performing linear weighted calculation on the feature value, based on preset feature coefficients of the respective one of the lexical features; and
selection code configured to cause the at least one processor to select a candidate antecedent with a largest coreference weight value that is determined, from the candidate antecedents, as a target antecedent referred to by the pronoun,
wherein the lexical feature comprises a semantic-dependent relevance between a first dependent word that depends on the pronoun, and a second dependent word that depends on the candidate antecedent.

8. The apparatus according to claim 7, wherein each of the lexical features comprises any one or any combination of a singular-plural feature of a respective one of the candidate antecedents, a distance between the respective one of the candidate antecedents and the pronoun, whether the respective one of the candidate antecedents occurs in a prepositional phrase, and semantic relevance between the pronoun and the respective one of the candidate antecedents.

9. The apparatus according to claim 7, wherein the first extraction code comprises:
searching code configured to cause the at least one processor to search an adjacent word of the pronoun, in the statement information; and
second extraction code configured to cause the at least one processor to extract the candidate antecedents and the lexical features, from the statement information, when a part of speech of the adjacent word is not a noun.

10. The apparatus according to claim 7, wherein the first extraction code comprises:
second obtaining code configured to cause the at least one processor to obtain, in the statement information, a noun phrase within a preset distance from the pronoun; and
second determining code configured to cause the at least one processor to:
determine whether the noun phrase and the pronoun are coreferential; and
use the noun phrase as one of the candidate antecedents, in response to the noun phrase and the pronoun being determined to be coreferential.

11. The apparatus according to claim 10, wherein the determining code is further configured to cause the at least one processor to:
determine whether a part of speech of a conjunction between the noun phrase and the pronoun is a predicate; and
determine that the noun phrase and the pronoun are capable of referring to each other, in response to the part of speech of the conjunction being determined to not be a predicate; and
determine that the noun phrase and the pronoun are not capable of referring to each other, in response to the part of speech of the conjunction being determined to be a predicate.

12. A non-transitory computer-readable storage medium storing instructions that cause at least one processor of an antecedent determining apparatus to:
obtain statement information;
determine whether a pronoun exists in the statement information;
extract candidate antecedents and lexical features of the candidate antecedents, from the statement information, in response to the pronoun being found in the statement information;
determine a coreference weight value of each of the candidate antecedents, by:
converting a respective one of the lexical features into a feature value; and
performing linear weighted calculation on the feature value, based on preset feature coefficients of the respective one of the lexical features; and
select a candidate antecedent with a largest coreference weight value that is determined, from the candidate antecedents, as a target antecedent referred to by the pronoun,
wherein the lexical feature comprises a semantic-dependent relevance between a first dependent word that depends on the pronoun, and a second dependent word that depends on the candidate antecedent.

13. The non-transitory computer-readable storage medium according to claim 12, wherein each of the lexical features comprises any one or any combination of a singular-plural feature of a respective one of the candidate antecedents, a distance between the respective one of the candidate antecedents and the pronoun, whether the respective one of the candidate antecedents occurs in a prepositional phrase, and semantic relevance between the pronoun and the respective one of the candidate antecedents.

14. The non-transitory computer-readable storage medium according to claim 12, wherein the instructions further cause the at least one processor to s:
   search an adjacent word of the pronoun, in the statement information; and
   extract the candidate antecedents and the lexical features, from the statement information, when a part of speech of the adjacent word is not a noun.

15. The non-transitory computer-readable storage medium according to claim 12, wherein the instructions further cause the at least one processor to:
   obtain, in the statement information, a noun phrase within a preset distance from the pronoun;
   determine whether the noun phrase and the pronoun are coreferential; and
   use the noun phrase as one of the candidate antecedents, in response to the noun phrase and the pronoun being determined to be coreferential.

* * * * *